United States Patent
Saragaglia

(10) Patent No.: US 10,652,490 B2
(45) Date of Patent: May 12, 2020

(54) DETECTION OF BAD PIXELS IN AN INFRARED IMAGE-CAPTURING APPARATUS

(71) Applicant: ULIS, Veurey-Voroize (FR)

(72) Inventor: Amaury Saragaglia, Eybens (FR)

(73) Assignee: ULIS, Veurey-Voroize (FR)

(*) Notice: Subject to any disclaimer, the term of this patent is extended or adjusted under 35 U.S.C. 154(b) by 59 days.

(21) Appl. No.: 15/739,660

(22) PCT Filed: Jun. 10, 2016

(86) PCT No.: PCT/FR2016/051394
§ 371 (c)(1),
(2) Date: Dec. 22, 2017

(87) PCT Pub. No.: WO2016/207507
PCT Pub. Date: Dec. 29, 2016

(65) Prior Publication Data
US 2018/0316882 A1  Nov. 1, 2018

(30) Foreign Application Priority Data

Jun. 26, 2015 (FR) ...................... 15 55964

(51) Int. Cl.
*H04N 5/367* (2011.01)
*H04N 5/33* (2006.01)
*H04N 5/365* (2011.01)

(52) U.S. Cl.
CPC ............ *H04N 5/3675* (2013.01); *H04N 5/33* (2013.01); *H04N 5/3651* (2013.01)

(58) Field of Classification Search
None
See application file for complete search history.

(56) References Cited

U.S. PATENT DOCUMENTS 5,532,484 A * 7/1996 Sweetser ............... H04N 5/33
  250/332
5,925,880 A   7/1999 Young et al.
(Continued)

FOREIGN PATENT DOCUMENTS

EP  0651566 A1  5/1995
EP  1401196 A1  3/2004

OTHER PUBLICATIONS

Authorized Officer: Trimeche, Mejdi, "International Search Report" issued in counterpart PCT application No. PCT/FR2016/051394, dated Jun. 7, 2016.
(Continued)

*Primary Examiner* — Quan Pham
(74) *Attorney, Agent, or Firm* — Kaplan Breyer Schwarz, LLP

(57) ABSTRACT

The invention relates to a method for detecting bad pixels from a pixel array of a device, for capturing an image, that is sensitive to infrared radiation. The method includes: receiving an input image captured by the pixel system, and calculating a score for a plurality of target pixels including at least some of the pixels from the input image. The score for each target pixel is generated on the basis of k pixels of the input image that are selected in a window of H by H pixels around the target pixel. H is an odd integer greater than or equal to 3, and k is an integer between 2 and 5. Each pixel, from the set formed of the k pixels and the target pixel, share at least one border or corner with another pixel from said set, and the values of the k pixels are at respective distances from the value of the target pixel, the k pixels being selected on the basis of the k distances. The method also includes detecting that at least one of the target pixels is a bad pixel on the basis of the calculated scores.

19 Claims, 4 Drawing Sheets

(56) References Cited

U.S. PATENT DOCUMENTS

| | | | |
|---|---|---|---|
| 2004/0239782 A1 | 12/2004 | Equitz et al. | |
| 2006/0007331 A1 | 1/2006 | Izumi et al. | |
| 2006/0290794 A1* | 12/2006 | Bergman | H04N 1/4097 348/246 |
| 2010/0030506 A1 | 2/2010 | Cairnduff | |
| 2010/0141810 A1 | 6/2010 | Wang et al. | |
| 2010/0295975 A1* | 11/2010 | Higuchi | G06T 7/0004 348/246 |
| 2011/0057802 A1 | 3/2011 | Topfer et al. | |
| 2011/0090371 A1 | 4/2011 | Cote et al. | |
| 2012/0091340 A1 | 4/2012 | Young | |
| 2012/0257825 A1* | 10/2012 | Yoo | G06T 5/005 382/167 |
| 2013/0329098 A1* | 12/2013 | Lim | H04N 9/64 348/246 |
| 2014/0010471 A1 | 1/2014 | Flanders et al. | |
| 2014/0016005 A1 | 1/2014 | Kishima et al. | |
| 2018/0184028 A1 | 6/2018 | Saragaglia et al. | |

OTHER PUBLICATIONS

Authorized Officer: Trimeche, Mejdi, "International Search Report" issued in related PCT application No. PCT/FR2016/051393, dated Sep. 7, 2016.
Non-Final Rejection received for related U.S. Appl. No. 15/739,556, dated Mar. 8, 2019, 18 pages.
Officer Mejdi Trimeche, International Preliminary Report on Patentability, International Patent Application PCT/FR2016/051394, dated Feb. 3, 2017, 28 pp.
Applicant Initiated Interview Summary received for U.S. Appl. No. 15/739,556, dated Jul. 1, 2019, 3 pages.
Final Rejection received for U.S. Appl. No. 15/739,556, dated Aug. 7, 2019, 31 pages.

* cited by examiner

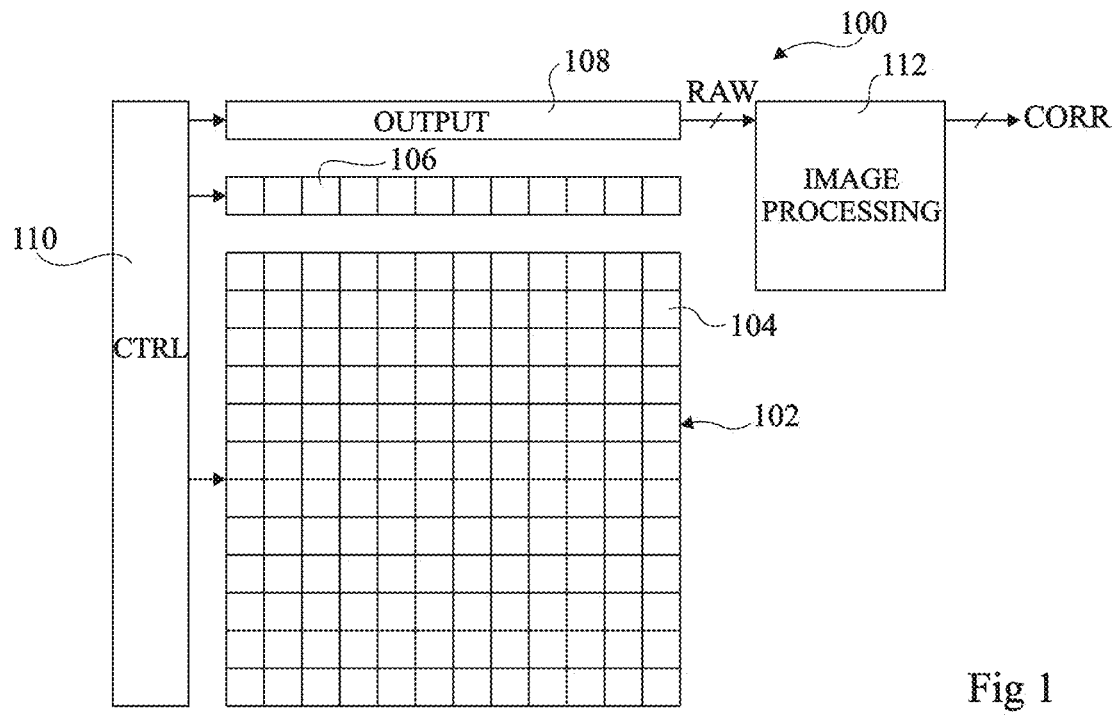
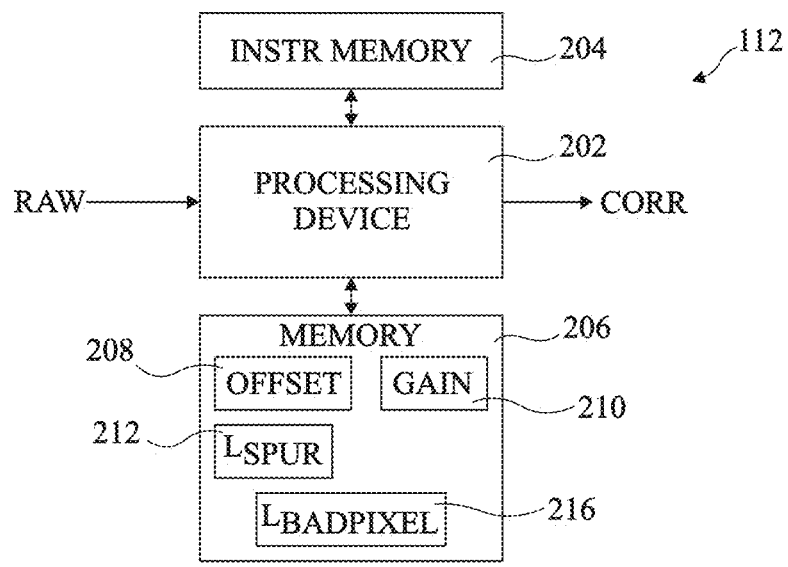

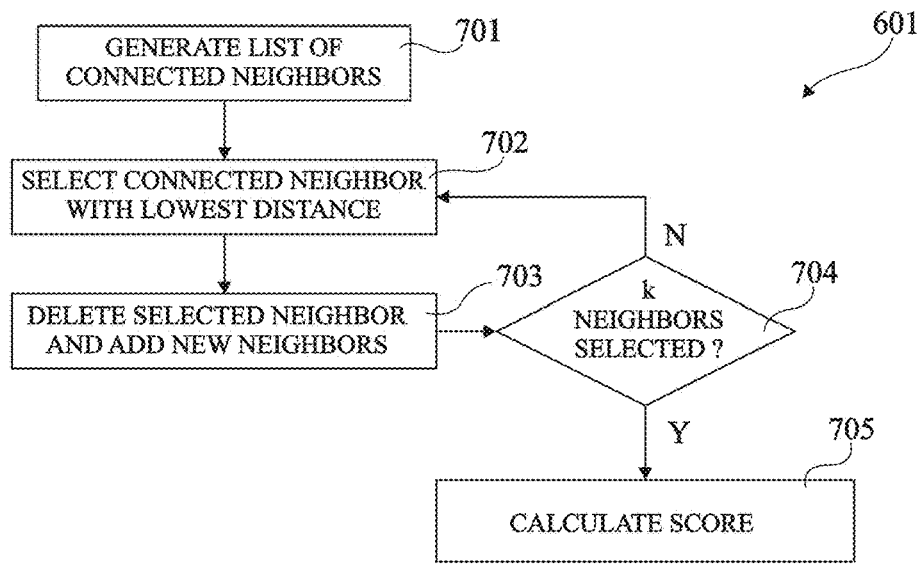
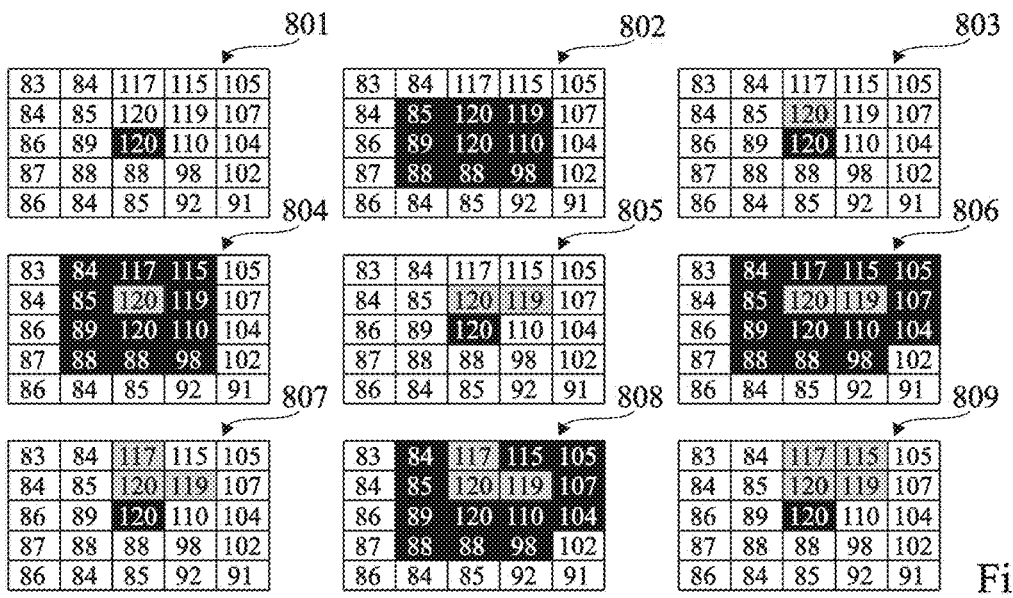
Fig 8A
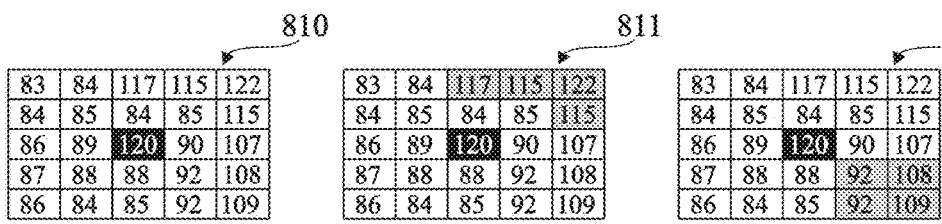
Fig 8B
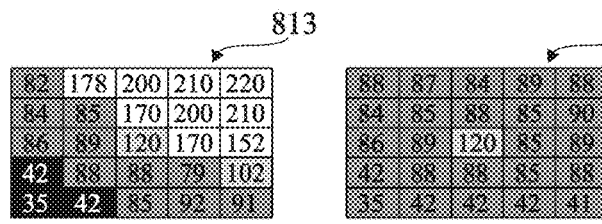
Fig 8C

DETECTION OF BAD PIXELS IN AN INFRARED IMAGE-CAPTURING APPARATUS

FIELD

The present disclosure relates to the field of infrared imaging devices, and in particular to a method and device for correcting spurious pixels in an image captured by an array of pixels sensitive to infrared light.

BACKGROUND

Infrared (IR) imaging devices, such as microbolometers or cooled IR imaging devices, comprise an array of IR-sensitive detectors forming a pixel array. To correct spatial non-uniformity between the pixels of such a pixel array, offset and gain correction is generally applied to each pixel signal (or "pixel value") of a captured image before it is displayed. The offset and gain values are generated during an in-house preliminary calibration phase of the device using uniform emissive sources (black-bodies) at controlled temperatures, and stored by the imaging device. Such spatial non-uniformity varies not only in time but also as a function of the temperature of optical, mechanical and electronic parts of the imaging device, and therefore an internal mechanical shutter is often used in the imaging device to aid image correction. This involves periodically capturing an image while the shutter is closed in order to obtain a reference image of a relatively uniform scene that can then be used for calibration.

It is common that, following the manufacturing process of such infrared imaging devices, one or more pixels in the pixel array are declared to be non-operational at the end of the manufacturer's initial calibration phase. Such pixels are generally known in the art as "bad pixels", and they are identified in an operability map stored by the imaging device. The pixel values generated by bad pixels cannot usually be relied upon, and therefore their pixel values are replaced by a value generated based on neighboring pixels in the image.

Moreover, it has been found that, during the lifetime of such imaging devices, the signal behaviour of one or more initially operational pixels may no longer be acceptably described by their initial calibration parameters. This may stem from various physical modifications or even mechanical damage caused by tiny internal moving particles left or released in the sensor package for example. These pixels will be referred to herein as spurious pixels. Such pixels are not listed in the initial operability map, and they can degrade the image quality.

In the case of shutter equipped imaging devices, the French patent application published as FR3009388 discloses a method of identifying such spurious pixels during any shutter closure period, giving means for recurrent updating of the operability map.

However, there are several drawbacks of using a shutter, such as the additional weight and cost, and the fragility of this component. Furthermore, for certain applications, the use of a shutter is unacceptable due to the time that is lost while the shutter is closed and calibration takes place. During this calibration period, no image of the scene can be captured.

In a shutter-less imaging device, there is a technical difficulty in identifying such spurious pixels from the image scene, particularly if the pixel values are in a textured zone of a captured image.

Assuming that spurious pixels can be identified, such spurious pixels could be merely added to the list of bad pixels. However, if the imaging device receives for example multiple shocks during its lifetime, at such a point where the density of spurious pixels in the image may no longer remain negligible, an image degradation would result.

There is thus a need in the art, in particular for shutter-less infrared imaging, for a device and method for detecting spurious pixels, at least for updating the operability map, but also for recalibrating the particular spurious pixels which would have become miscalibrated.

SUMMARY

It is an aim of embodiments of the present description to at least partially address one or more needs in the prior art.

According to one aspect, there is provided a method of detecting spurious pixels of a pixel array of an imaging device sensitive to infrared radiation, the method comprising: receiving, by a processing device of the imaging device, an input image captured by the pixel array; calculating a score for a plurality of target pixels comprising at least some of the pixels of the input image, the score for each target pixel being generated based on k pixels of the input image selected within a window of H by H pixels around the target pixel, H being an odd integer of 3 or more, and k being an integer of between 2 and 5, each of the pixels of the set formed by the k pixels and the target pixel sharing at least one border or a corner with another pixel of said set, and the values of the k pixels being at respective distances from the value of the target pixel, the k pixels being selected based on the k distances; and detecting that at least one of the target pixels is a spurious pixel based on the calculated scores.

According to one embodiment, H is an odd integer equal to 5 or more.

According to one embodiment, the selection of k pixels comprises the successive steps of: forming, around the target pixel, a first group consisting of all of the pixels sharing at least one border or a corner with the target pixel, excluding the target pixel, and selecting within this first group a first pixel having a value that is closest to that of the target pixel; forming a second group consisting of the first group, excluding the first selected pixel, and of all the pixels sharing at least one border or a corner with the first selected pixel, and selecting within this second group a second pixel having a value that is closest to that of the target pixel; and repeating the operations of extending the selection group and then selecting each subsequent pixel, in each new extended group respectively, having a value closest to that of the target pixel, until k pixels have been selected.

According to one embodiment, the k pixels are selected in order to minimize the sum of the k distances.

According to one embodiment, the score is equal to the sum of the k distances.

According to one embodiment, detecting the at least one spurious pixel comprises comparing at least some of the scores with a threshold value ($thr_{SPUR}$).

According to one embodiment, comparing at least some of the scores with a threshold value involves comparing a subset of the scores with the threshold value, the subset comprising a plurality of the highest scores, and wherein the threshold value is calculated based on the following equation:

$$thr_{SPUR} = Q3 + x_{EI} \times (Q3 - Q1)$$

where $x_{EI}$ is a parameter equal to at least 1.0 and Q1 and Q3 are the first and third quartiles respectively of the subset.

According to one embodiment, the at least some scores are selected by applying a further threshold (thr$_{outlier}$) to the calculated scores.

According to one embodiment, the further threshold is calculated based on an assumption that the pixel values in the image have a probability distribution based on the Laplace distribution.

According to one embodiment, the further threshold is calculated based on the following equation:

$$thr_{outlier} = \frac{\ln(4)}{\hat{\lambda}} + 1.5 \times \frac{\ln(3)}{\hat{\lambda}}$$

where $\hat{\lambda}$ is an estimation of the parameter of the exponential distribution $f(x)=\lambda e^{-\lambda x}$ corresponding to the absolute value (|S|) of the calculated scores.

According to one embodiment, the method further comprises, prior to calculating said scores, correcting the first input image by applying gain and offset values to at least some of the pixel values of the first input image.

According to a further aspect, there is provided a computer-readable storage medium storing instructions for implementing the above method when executed by a processing device.

According to a further aspect, there is provided an image processing device comprising: a memory storing an input image; and a processing device adapted to: receive an input image captured by a pixel array; calculate a score for a plurality of target pixels comprising at least some of the pixels of the input image, the score for each target pixel being generated based on k pixels of the input image selected within a window of H by H pixels around the target pixel, H being an odd integer of 3 or more, and k being an integer of between 2 and 5, each of the pixels of the set formed by the k pixels and the target pixel sharing at least one border or a corner with another pixel of said set, and the values of the k pixels being at respective distances from the value of the target pixel, the k pixels being selected based on the k distances; and detect that at least one of the target pixels is a spurious pixel based on the calculated scores.

BRIEF DESCRIPTION OF THE DRAWINGS

The foregoing and other features and advantages will become apparent from the following detailed description of embodiments, given by way of illustration and not limitation with reference to the accompanying drawings, in which:

FIG. 1 schematically illustrates an imaging device according to an example embodiment;

FIG. 2 schematically illustrates an image processing block of the imaging device of FIG. 1 in more detail according to an example embodiment;

FIG. 7 is a flow diagram illustrating operations in a method of generating pixel scores according to an example embodiment;

FIG. 8A illustrates an example of a selection of connected neighboring pixels according to an example embodiment of the present disclosure;

FIG. 8B illustrates examples of connected and unconnected neighboring pixels according to an example embodiment; and FIG. 8C illustrates an example of an edge and a spurious pixel according to an example embodiment.

DETAILED DESCRIPTION

Figure 3:
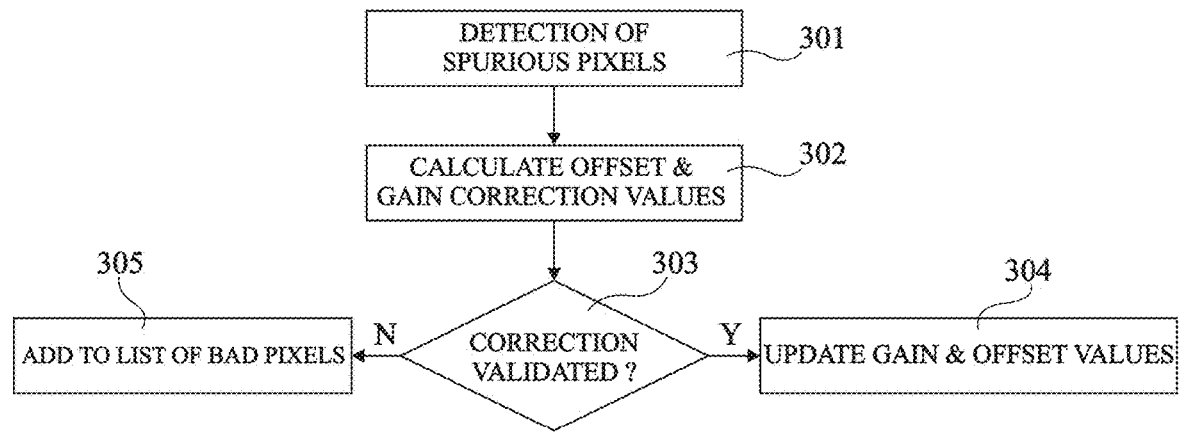
FIG. 3 is a flow diagram showing operations in a method of detecting and correcting spurious pixels according to an example embodiment of the present disclosure.

While some of the embodiments in the following description are described in relation to a pixel array of the microbolometer type, it will be apparent to those skilled in the art that the methods described herein could be equally applied to other types of IR imaging devices, including cooled devices. Furthermore, while embodiments are described herein in relation to a shutter-less IR imaging device, they could be equally applied to an IR imaging device comprising a mechanical shutter and to images captured by such a device.

FIG. 1 illustrates an IR imaging device 100 comprising a pixel array 102 sensitive to IR light. For example, in some embodiments the pixel array is sensitive to long-wave IR light, such as light with a wavelength of between 7 and 13 μm. The device 100 is for example capable of capturing single images and also sequences of images forming video. The device 100 is for example a shutter-less device.

For ease of illustration, a pixel array 102 of only 144 pixels 104, arranged in 12 rows and 12 columns, is illustrated in FIG. 1. In alternative embodiments the pixel array 102 could comprise any number of rows and columns of pixels. Typically, the array for example comprises 640 by 480, or 1024 by 768 pixels.

Each column of pixels of the array 102 is associated with a corresponding reference structure 106. Though not functionally a picture element, this structure will be referred to herein as a "reference pixel" by structural analogy with the imaging (or active) pixels 104. Furthermore, an output block (OUTPUT) 108 is coupled to each column of the pixel array 102 and to each of the reference pixels 106, and provides a raw image RAW.

A control circuit (CTRL) 110 for example provides control signals to the pixel array, to the reference pixels 106, and to the output block 108. The raw image RAW is for example provided to an image processing block (IMAGE PROCESSING) 112, which applies offsets and gains to the pixels of the image to produce a corrected image CORR.

Each of the pixels 104 for example comprises a bolometer. Bolometers are well known in the art, and for example comprise a membrane suspended over a substrate, comprising a layer of IR absorbing material and having the property that their resistance is modified by the temperature rise of the membrane related to the presence of IR radiation.

The reference pixel 106 associated with each column for example comprises a blind bolometer, which for example has a similar structure to the active bolometers of the pixels 104 of the array, but are rendered insensitive to radiation from the image scene, for example by a shield formed of a reflective barrier and/or by heat sinking by design, e.g. by providing a high thermal conductance to the substrate, the bolometer for example being formed in direct contact with the substrate.

During a read operation of the pixel array 102, the rows of pixels are for example read out one at a time.

An example of a pixel array of the bolometer type is for example discussed in more detail in the U.S. Pat. No. 7,700,919, assigned to the present applicant, the contents of which is hereby incorporated by reference to the extent permitted by the law.

FIG. 2 illustrates the image processing block 112 of FIG. 1 in more detail according to an example embodiment.

The functions of the image processing block 112 are for example implemented in software, and the image processing block 112 comprises a processing device (PROCESSING DEVICE) 202 having one or more processors under the control of instructions stored in an instruction memory (INSTR MEMORY) 204. In alternative embodiments, the functions of the image processing block 112 could be implemented at least partially by dedicated hardware. In such a case, the processing device 202 for example comprises an ASIC (application specific integrated circuit) or FPGA (field programmable gate array), and the instruction memory 204 may be omitted.

The processing device 202 receives the raw input image RAW, and generates the corrected image CORR, which is for example provided to a display (not illustrated) of the imaging device. The processing device 202 is also coupled to a data memory (MEMORY) 206 storing offset values (OFFSET) 208, gain values (GAIN) 210, a list ($L_{SPUR}$) 212 of identified spurious pixels, and a list ($L_{BADPIXEL}$) of bad pixels.

The offset values are for example presented by a vector $V_{COL}$ representing a structural column spread, and a matrix $OFF_{DISP}$ representing a 2D non-column structural dispersion introduced by the pixel array 102. The column spread for example principally results from the use of the reference pixel 106 in each column, whilst the row of column reference pixels is generally not perfectly uniform. The 2D non-column dispersion for example principally results from local physical and/or structural differences between the active bolometers of the pixel array resulting for example from technological process dispersion.

The generation of the vector $V_{COL}$ and the matrix $OFF_{DISP}$, and the correction of pixel values based on this vector and matrix is described in more detail in the US patent application U.S. Ser. No. 14/695,539 filed on Apr. 24, 2015 assigned to the present applicant, the contents of which is hereby incorporated by reference to the extent permitted by the law, and in the French patent application FR 14/53917 filed on Apr. 30, 2014, and in the Japanese patent application JP 2015-093484 filed on Apr. 30, 2015, also in the name of the present applicant.

A method as described in these applications will now be described. It is assumed that a raw image RAW has been captured by the pixel array 102 of FIG. 1, and that the pixel array is of the type that each column of the array is associated with a corresponding reference pixel 106.

A corrected image CORR is for example generated based on the raw image RAW by applying the following equation:

$$CORR(x,y) = GAIN(x,y) \times (RAW(x,y) - \alpha OFF_{COL}(x,y) - \beta OFF_{DISP}(x,y) - \gamma) - res \qquad \sim 1$$

where x,y are the pixel coordinates of pixels 104, $\alpha$ and $\beta$ are scale factors, $\gamma$ is a gain correction value, GAIN(x,y) is a gain value, $OFF_{COL}(x,y)$ and $OFF_{DISP}(x,y)$ are offset values, $OFF_{COL}$ being a matrix comprising, in each of its rows, the column vector $V_{COL}$, $OFF_{DISP}$ being the reference dispersion matrix, and res is a residual correction, which for example is used in some embodiments to correct any column residues and/or dispersion residues remaining in the image.

The scale factor $\alpha$ is for example determined based on the following equation:

$$\alpha = \frac{\sum_x \left( \frac{1}{m} \sum_y T(RAW(x,y)) \times T(V_{COL}(x)) \right)}{\sum_x T(V_{COL}(x)) \times T(V_{COL}(x))} \qquad \sim 2$$

where T( ) represents a high pass filter applied to the column vector $V_{COL}$ and to the input image RAW, and m is the number of rows in the image. In other words, the determination of the scale factor $\alpha$ for example involves applying the high-pass filter to the raw image along its rows and also to the reference column vector; determining column averages of the filtered image, resulting in a vector of the same size as the reference column vector, and then determining the scale factor as the minimization of the differences between the two column vectors, i.e. between the column averages of the filtered image and the filtered column vector.

The scale factor $\beta$ is for example determined based on the following equation:

$$\beta = \frac{\sum (\nabla_x RAW \cdot \nabla_x OFF_{DISP} + \nabla_y RAW \cdot \nabla_y OFF_{DISP})}{\sum ((\nabla_x OFF_{DISP})^2 + (\nabla_y OFF_{DISP})^2)} \qquad \sim 3$$

where $\nabla_x$ is the pixel gradient value between adjacent pixels in the horizontal direction in the image, in other words along each row, and $\nabla_y$ is the pixel gradient value between adjacent pixels in the vertical direction in the image, in other words along each column.

While in the following the gain and offset correction is described as being based on the equations 1 to 3 above, in alternative embodiments other correction methods could be employed.

FIG. 3 is a flow diagram showing operations in a method of detecting and correcting spurious pixels according to an example embodiment. This method is for example implemented by circuit 112 of FIG. 2 each time a new image is captured.

Spurious pixels are pixels for which the offset and gain have departed from their originally calibrated values, for example as a result of a mechanical shock or damage caused by tiny internal moving particles. A spurious pixel may correspond to an additional "bad pixel", which has for example been destroyed and is therefore unable to give a usable signal in relation with the scene. However, the present inventors have found that often a spurious pixel may still be able to give a usable signal in relation to the scene, but its value has become permanently shifted, in a stable manner, in offset and gain with respect to the originally calibrated value.

In an operation 301, spurious pixels are detected in an image CORR, which corresponds to a raw image RAW corrected based on the gain and offset values. The detected spurious pixels form the list $L_{SPUR}$. As will be described in more detail below, in one embodiment the spurious pixels are detected based on a calculation of the distance (in terms of pixel values) to connected neighbors of each pixel in the image. However, in alternative embodiments, other techniques could be applied in order to identify the spurious pixels. For example, one or more spurious pixels could be identified manually by a user. Furthermore, in some embodiments, the image CORR could be of a uniform scene, for example if it is captured with a closed shutter of an imaging device, thereby facilitating the identification of spurious pixels.

In a subsequent operation 302, offset and gain correction values are calculated for each identified spurious pixel. In other words, for each identified spurious pixel, correction values are calculated for correcting the currently stored offset and gain values. This calculation is for example based on at least two captured images.

In a subsequent operation 303, a validation of these offset and gain correction values is for example performed for each spurious pixel. The validation is for example performed at a different focal plane temperature to the temperature when the offset and gain correction values were calculated, in order to verify that the calculated corrections provide suitable correction for these pixels when the focal plane temperature changes. The focal plane temperature corresponds to the temperature of the pixel array. In other words, the inventors have noticed that at least part of the detected spurious pixels can still be permanently corrected even if their offset and gain have shifted, and that the quality of the calculated offset and gain correction values obtained for these spurious pixels is for example ascertained by their stability whilst the focal plane temperature has changed.

If in operation 303 the gain and offset correction values are validated, the gain and offset values 208, 210 for the spurious pixels are for example updated, in an operation 304, by the correction values calculated in operation 302.

Alternatively, if in operation 303 the gain and offset correction values are not validated, in an operation 305 the spurious pixels are added to a list of bad pixels. In other words, the spurious pixels for which the corrections are unstable with the focal plane temperature change are classed as additional bad pixels. The pixels on the list of bad pixels for example have their pixel values replaced by a pixel estimation based on one or more of their neighboring pixels.

In an alternative embodiment, all spurious pixels identified in operation 301 are systematically added to the list of bad pixels, and are then only removed from this list if the correction is validated in operation 303.

In some embodiments, rather than attempting to correct the pixels identified as being spurious, the operations 302, 303 and 304 could be omitted, and the method could systematically involve adding all detected spurious pixels to the list of bad pixels in operation 305. Such an approach would save the processing cost associated with the operations 302 and 303. As yet a further alternative, some pixels could be initially added to the list of bad pixels, and if the number of bad pixels exceeds a threshold level, one or more previously identified spurious pixels, or one or more newly identified spurious pixels, could be corrected using the operations 302 and 303.

Figure 4:
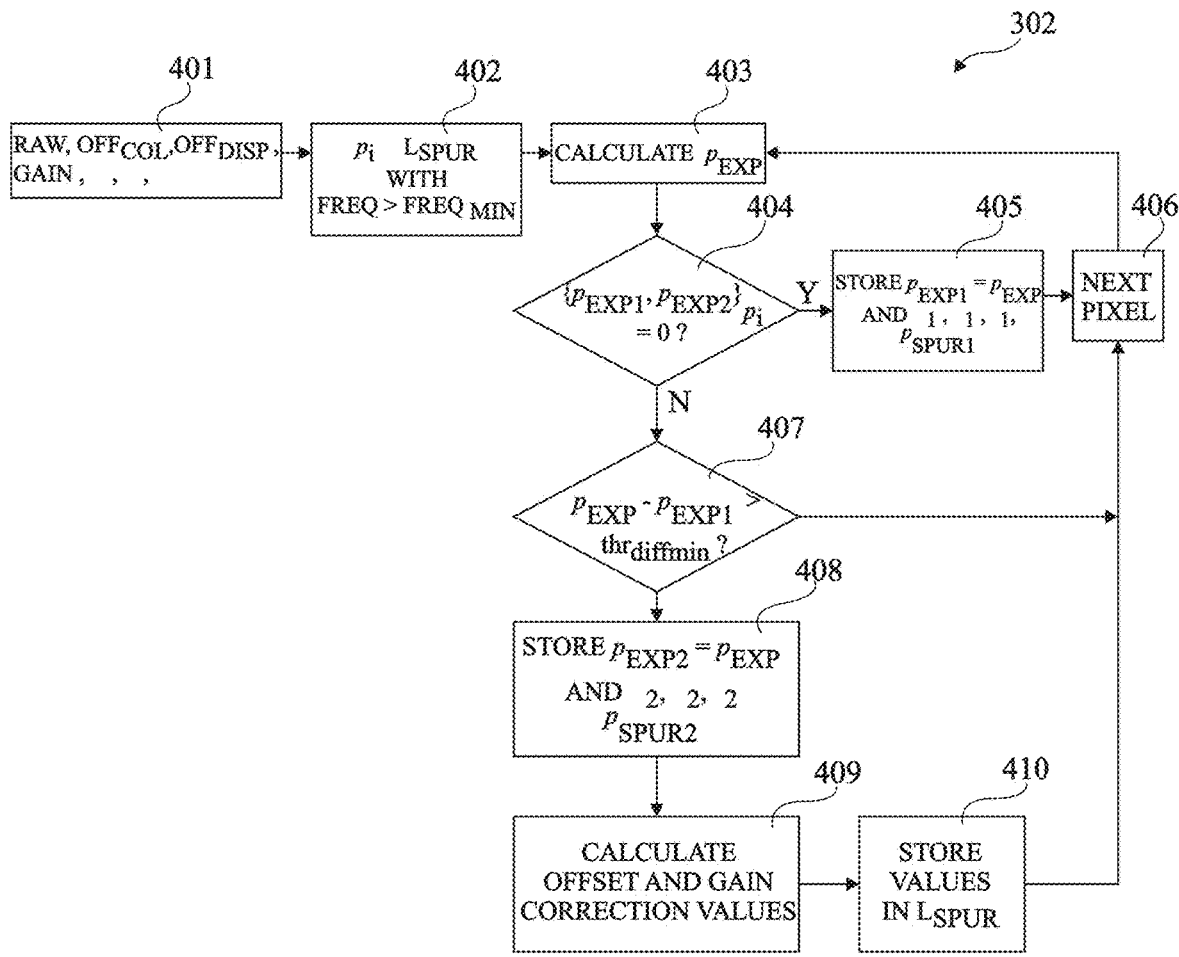
FIG. 4 is a flow diagram illustrating operations in a method of generating offset and gain correction values according to an example embodiment of the present disclosure.

FIG. 4 is a flow diagram illustrating an example of operations for calculating offset and gain correction values in operation 302 of FIG. 3.

In an operation 401, an image is for example captured and the pixel values of at least some of the pixels are corrected using the offset and gain values 208, 210, for example based on equation 1 above. The inputs to the method are for example the raw captured image RAW, offset values OFF$_{COL}$ and OFF$_{DISP}$, gain values GAIN and the terms $\alpha$, $\beta$ and $\gamma$ used for correcting the image according to equation 1 above. It is also assumed that the list L$_{SPUR}$ of spurious pixels has been generated in operation 301 of FIG. 3.

In an operation 402, the pixels $p_i$ of the list L$_{SPUR}$ for which a frequency of detection FREQ exceeds a threshold level FREQ$_{MIN}$ are selected, and the following operations of the method are performed only on these pixels. This operation for example means that the correction algorithm is applied only to pixels that are repeatedly detected as spurious pixels. For example, each time a pixel $p_i$ is detected as a spurious pixel, the detection frequency FREQ is calculated as being equal to the number of times that pixel has been detected as spurious in the previous N images, where N is for example between 2 and 20. If this frequency is above FREQ$_{MIN}$, equal for example to N/2, the pixel is selected. In some embodiments, this operation is omitted, and the subsequent operations of the method are applied to all pixels on the list L$_{SPUR}$.

In an operation 403, an expected value $p_{EXP}$ of the pixel is calculated. For example, when a pixel has become spurious, its value $p_{CORR}$, after gain and offset correction, but which has been identified as an outlier, can be expressed as:

$$p_{CORR} = g \times (p_{SPUR} - \alpha \times o_{COL} - \beta \times o_{DISP} - \gamma) - \text{res} \qquad \sim 4$$

where $p_{SPUR}$ is the pixel value of the spurious pixel of the matrix RAW, $o_{COL}$ and $o_{DISP}$ are the values of the matrix OFF$_{COL}$ and OFF$_{DISP}$ applied to the pixel, g is the value of the matrix GAIN applied to the pixel, and $\alpha$, $\beta$, $\gamma$ and res are the same as for equation 1 above. Assuming that this pixel can be appropriately corrected, gain and offset correction values $s_{Gain}$ and $s_{Off}$ exist such that:

$$p_{EXP} = (g - s_{Gain}) \times (p_{SPUR} - \alpha \times o_{COL} - \beta \times (o_{DISP} - s_{Off}) - \gamma) - \text{res} \qquad \sim 5$$

where $p_{EXP}$ is the expected pixel value, and is for example equal to or close to the value that could have been obtained if the gain and offset values were recalculated based on one or more new reference images. Given that there are two unknowns, to determine the values of both $s_{Gain}$ and $s_{Off}$, two expected values are for example calculated as will now be described.

The value of expected value $p_{EXP}$ is for example calculated based on its neighboring pixels. For example, an algorithm commonly used to correct bad pixels is applied, such as pixel data interpolation, extrapolation, and/or a technique known in the art as Inpainting.

In an operation 404, it is verified whether or not, in addition to the new value $p_{EXP}$, a previous value $p_{EXP1}$ or $p_{EXP2}$ is also available for the pixel $p_{SPUR}$, in other words whether or not the set $\{p_{EXP1}, p_{EXP2}\}_{p_i}$ is empty. If a previous value $p_{EXP1}$ exists, this implies that it was determined for a previous image in which the pixel values of at least some of the pixels were corrected using the same offset and gain values 208, 210 as applied to the current image. In other words, the locations of the pixels corrected in the current and previous images are for example the same. If the set $\{p_{EXP1}, p_{EXP2}\}_{p_i}$ is empty and there are not previous values, in an operation 405 the value of $p_{EXP}$ is stored as $p_{EXP1}$, and the scale factors $\alpha$ and $\beta$ and the gain correction value $\gamma$ applied to the pixel are stored as values $\alpha_1$, $\beta_1$, $\gamma_1$, and the pixel value $p_{SPUR}$ is also stored as the value $p_{SPUR1}$. In an operation 406, the next pixel of the list L$_{SPUR}$ for which the frequency of detection FREQ is greater than FREQ$_{MIN}$ is for example selected, and the method returns to operation 403.

If, when operation 404 is performed, there is already a value of $p_{EXP1}$ for the pixel, in a subsequent operation 407 it is for example determined whether or not the absolute difference between the new value $p_{EXP}$ and the previous value $p_{EXP1}$ is above a threshold value thr$_{diffmin}$. If not, the method returns to operation 406. If however the pixel values are sufficiently spaced, then the next operation is 408.

In operation 408, the new value $p_{EXP}$ is stored as $p_{EXP2}$, and the scale factors α and β and the gain correction value γ applied to the pixel are stored as values $α_2$, $β_2$, $γ_2$, and the pixel value $p_{SPUR}$ is also stored as the value $p_{SPUR2}$.

In an operation 409, offset and gain correction values $s_{Gain}$ and $s_{Off}$ are for example calculated based on the estimations $p_{EXP1}$ and $p_{EXP2}$. For example, the value of $s_{Off}$ is calculated based on the following equation:

$$s_{Off} = \frac{p_{EXP2} \times (p_{SPUR1} - ó_1) - p_{EXP1} \times (p_{SPUR2} - ó_2)}{β_2 \times p_{EXP1} - β_1 \times p_{EXP2}} \quad \sim 7$$

where $ó_i = α_i \times o_{COL} + β_i \times o_{DISP} + γ_i$.

The value of $s_{Gain}$ is for example calculated based on the following equation:

$$s_{Gain} = g - \frac{p_{EXP1}}{p_{SPUR1} - ó_1 + β_1 \times λ_{Offset}} \quad \sim 8$$

Of course, it would be possible to first calculate a value of $s_{Gain}$ and then to substitute this value in order to calculate the value of $s_{Off}$.

In a subsequent operation 410, the gain and offset correction values $s_{Gain}$ and $s_{Off}$ are for example stored in the list $L_{SPUR}$ in association with the pixel $p_{SPUR}$. The method then for example returns to operation 406 until all of the pixels in the list $L_{SPUR}$ for which the frequency of detection FREQ is greater than $FREQ_{MIN}$ have been processed. The method is then for example repeated when a next image is captured.

While in some embodiments the calculated offset and gain correction values $s_{Off}$ and $s_{Gain}$ could be used to directly modify the gain and offset values 208, 210, at least one verification of these values is for example performed to verify their validity in the presence of a temperature change, as will now be described with reference to FIG. 5.

Figure 5:
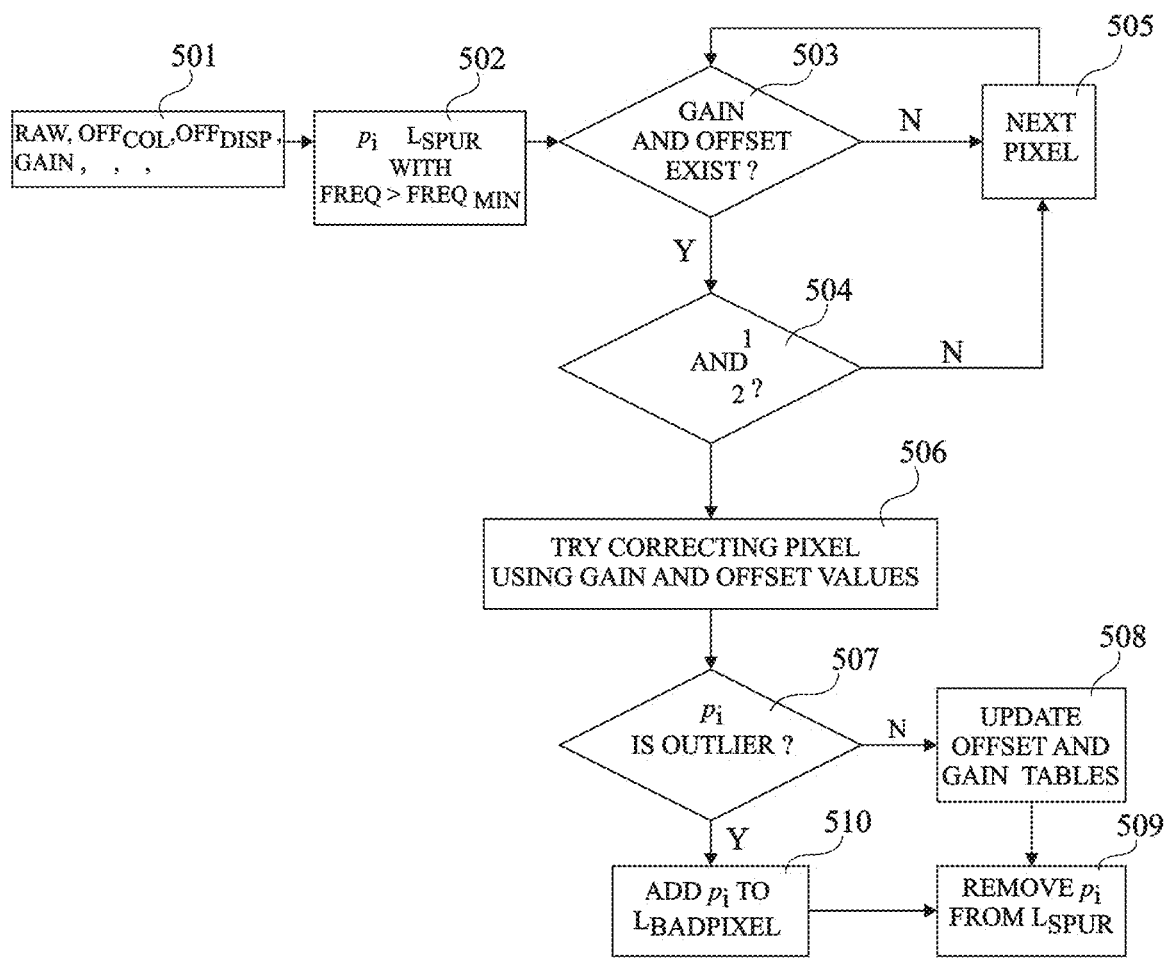
FIG. 5 is a flow diagram illustrating operations in a method of validating offset and gain correction values according to an example embodiment.

FIG. 5 is a flow diagram illustrating an example of implementation of the operation 303 of FIG. 3 for validating the offset and gain correction values for one or more pixels.

In an operation 501, an image is captured and corrected using the offset and gain values 208, 210, providing as inputs the captured image RAW, and the offset values $OFF_{COL}$, $OFF_{DISP}$, gain values GAIN, and the terms α, β and γ used for correcting the image according to equation 1 above. Furthermore, an indication of the focal plane temperature is for example received. Indeed, as mentioned above in relation to operation 303 of FIG. 3, validation of the offset and gain values is for example performed at a different focal plane temperature to when the offset and gain values were calculated. Thus the indication of the focal plane temperature is used to check whether the focal plane temperature has changed. In the example of FIG. 5, the temperature indication is given by the value of the scale factor β, which varies with temperature. The inventors have noticed that the temperature information provided by the β factor is reliable enough in this context of validating the new corrections of spurious pixels. However, in alternative embodiments, a temperature value T generated by a temperature sensor could be used. For example, the pixel array comprises a temperature sensor built into the array or in contact with it to provide the focal plane temperature.

In an operation 502, pixels are for example selected from the pixels $p_i$ of the list $L_{SPUR}$ for which a frequency of detection FREQ exceeds a threshold level $FREQ_{MIN}$, and the following operations of the method are performed only on these pixels.

In an operation 503, it is then determined whether gain and offset correction values exist for a first of the pixels $p_i$. If so, the next operation is 504, whereas if not, the next operation is 505 in which the next pixel in the list is selected and the method returns to operation 503.

In alternative embodiments, the method of FIG. 5 could be applied to all pixels $p_i$ in the list for which offset and gain correction values have been calculated, irrespective of the frequency of detection. Thus the operation 502 could be omitted.

In an operation 504, it is determined whether the current temperature dependant value β is equal or close to either of the values $β_1$ and $β_2$ associated with the pixels $p_{SPUR1}$ and $p_{SPUR2}$ stored in the list $L_{SPUR}$ in operations 405 and 408 respectively of the method of FIG. 4. For example, it is determined whether the absolute difference between β and $β_1$ is above a threshold $β_{min}$, and whether the absolute difference between β and $β_2$ is above the threshold $β_{min}$. If either of these differences is below the threshold, the method for example returns to operation 505. If however there has been a significant temperature change (β change) since the calculation of the gain and offset correction values, the next operation is 506. As mentioned above, rather than using the scale factor β as an indication of the temperature, a temperature value T could be captured by a temperature sensor. In such a case, the values β, $β_1$ and $β_2$ will be replaced in operation 504 of FIG. 5 by temperatures T, $T_1$ and $T_2$ respectively, where the values $T_1$ and $T_2$ are temperature values measured in relation to the previous images and stored in operations 405 and 408 respectively of FIG. 4.

In operation 506, the gain and offset correction values for the pixel $p_i$ are used as a trial to correct the pixel value $p_{SPUR}$ obtained for the image captured in operation 501, for example by applying the equations 1, 2 and 3 above, with the gain and offset values modified as in equation 5.

In an operation 507, it is then determined whether the modified value of pixel $p_i$ is still an outlier, in other words it is still identified as a spurious pixel. For example, a technique employed in operation 301 to detected spurious pixels is applied to the image with the corrected pixel $p_i$.

If it is not an outlier, the correction values are considered to be validated, since the focal plane temperature has been found in step 504 to be far enough from its two previous values, and despite this temperature change the pixel value is not an outlier. Thus, in a next operation 508, new offset and gain values corrected using the correction values $s_{Offset}$ and $s_{Gain}$ are for example stored in the offset and gain tables 208, 210, and then in an operation 509, they are removed from the list $L_{SPUR}$ of spurious pixels.

If however the pixel $p_i$ is still an outlier, then it is for example assumed that the pixel cannot be corrected by corrections to the gain and offset values. The pixel is therefore for example added to the list $L_{BADPIXEL}$ of bad pixels in an operation 510, and then operation 509 is performed to remove the pixel from the list $L_{SPUR}$.

An example of a method for detecting spurious pixels implemented in operation 301 of FIG. 3 will now be described in more detail with reference to FIGS. 6, 7 and 8.

Figure 6:
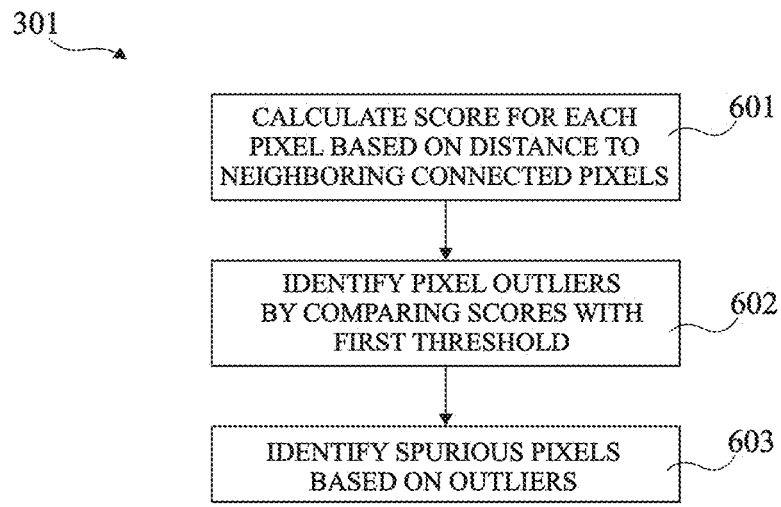
FIG. 6 is a flow diagram illustrating operations in a method of identifying spurious pixels according to an example embodiment.

FIG. 6 is a flow diagram illustrating an example of operations in a method of detecting spurious pixels in a captured image. The method is for example implemented by the image processing device 112 of FIG. 2, and the captured image has for example been corrected by applying the offset and gain values 208, 210.

In an operation 601, a score is calculated for each pixel of the input image based on a distance in terms of pixel values calculated to neighboring connected pixels.

In an operation 602, outliers are for example identified by comparing the calculated scores with a first threshold. This step is for example used to select only a subset of the pixels as potential spurious pixels. In some embodiments, this step could however be omitted.

In an operation 603, spurious pixels are for example identified based on the outliers identified in operation 602 (or from the whole image in the case that the operation 602 is omitted).

FIG. 7 is a flow diagram illustrating an example of the operations for implementing the operation 601 of FIG. 6 for generating the scores. This method is for example applied to each pixel of the image in turn, for example in raster-scan order, although the pixels could be processed in any order. The operations of this method will be discussed with reference to FIG. 8A.

FIG. 8A illustrates nine views 801 to 809 of a 5 by 5 window of pixels representing an example application of the method of FIG. 7. More generally, the window size can be defined as H×H, where H is an odd integer equal to at least 3, and for example equal to at least 5. In some embodiments, H is equal to or lower than 15. The H by H window is around a target pixel for which a score is to be generated, in other words, the target pixel is for example the central pixel of the window.

Referring again to FIG. 7, in an operation 701, a list of connected neighbours of the pixel is generated. The connected neighbors are any pixels sharing a border or a corner point with a pixel that has already been selected. Thus, for a pixel that is not at an edge of the image, there will be eight connected neighbors. Initially, only the pixel for which a score is to be generated is selected. This pixel will be referred to herein as the target pixel. For example, as represented by the view 801 of FIG. 8A, a score is to be calculated for a central pixel, shaded in the figure, having a pixel value of 120. As represented by the view 802, the connected neighbours are the eight pixels surrounding the central pixel 120.

In an operation 702, among the connected neighbors, a pixel having a pixel value with the lowest distance from the pixel value of the target pixel is selected. For example, the distance d(a,b) between pixel values a and b is defined as d(a,b)=|a−b|. As represented by the view 803 in FIG. 8A, a pixel having a value of 120, equal to the value of the target pixel, is selected.

In an operation 703, the neighbor selected in operation 702 is removed from the list of connected neighbors of the target pixel, and new connected neighbors are added which comprise connected neighbors of the newly selected neighbor identified in operation 702. For example, as represented by the view 804 in FIG. 8A, three new pixels connected to the newly selected pixel are added to the list.

In an operation 704, it is determined whether k connected neighbors have been selected. The number k of neighbors to be considered is for example a fixed parameter which is selected based on the highest expected number of connected spurious pixels. For example, for some image sensors, it may be considered that spurious pixels are always isolated from each other. In such a case, k can be chosen as being equal to just 2. Alternatively, if it is considered to be possible that for a given image sensor two connected spurious pixels may be identified, a higher value of k is for example selected, for example equal to between 3 and 5. In the example of FIG. 8A, k is equal to 4. If k neighbors have not yet been selected, the method returns to operation 702, in which a new connected neighbor is again selected. Operations 703 and 704 are then repeated until k neighbors have been selected, and then an operation 705 is performed. As represented in views 805 to 809 of FIG. 8A, a block of four neighbors of the target pixel are selected.

FIG. 8B illustrates views of an H by H window of pixels, and demonstrates the difference between a distance calculation based simply on nearest neighbors in a window, and one based on nearest connected neighbors. As represented by a view 810, the central pixel is an outlier, because the difference between its value and its surrounding neighborhood is high.

A view 811 represents four selected neighbors in the window having values closest to the central pixel, and unconnected with it. This calculation would lead to a low score indicating that the pixel is not an outlier.

A view 812 represents four selected connected neighbors. In this case, four entirely different pixels are selected, and the scores clearly indicate that the target pixel is an outlier.

Referring again to FIG. 7, in operation 705, the score for the target pixel is calculated based on the selected connected neighbors. For example, the score $s_i$ for a target pixel $p_i$ is calculated based on the following equation:

$$s_i = w_i \Sigma_{j=1}^{k}(p_i - p_j) \qquad \sim 9$$

where $w_i$ is a weight associated with the pixel, and $p_1$ to $p_k$ are the k selected connected neighbors.

The weight $w_i$ for a pixel $p_i$ is for example determined using the following equation:

$$w_i = \sqrt{1/(\Sigma_{p=H}^{H^2-H} \text{std}_{loc}(p) + \varepsilon)} \qquad \sim 10$$

where $\text{std}_{loc}$ is an array of local standard deviations calculated for the pixels in the H by H window of the pixel $p_i$, sorted in ascending order, and E is a parameter, for example set to a very low value such as 0.0001. Thus the weight is based on the standard deviations of a subrange of the pixels in the H by H window, the subrange being selected as the pixels between H and ($H^2$−H) based on the ranked standard deviations of the pixels. In alternative embodiments, the weight could be calculated based on the standard deviation of a different subset of the pixels.

In alternative embodiments, a different weight could be applied to the scores, or no weight could be applied to the scores. An advantage of applying a weight based on the local standard deviation of the pixel is that the texture in the zone of the pixel can be taken into account, a higher weighting being given to the scores of pixels in smooth zones, and a lower weighting to the scores of pixels in textured zones where a relatively high deviation can be expected.

FIG. 8C illustrates views 813, 814 of two different H by H windows of pixels, and demonstrates an advantage of applying the weight based on the local standard deviation to the pixels. The score of the target pixel in both views would be the same. However, in the view 813, there is an edge passing through the target pixel, and thus the pixel should not be considered as an outlier. In the view 814, the image is relatively smooth in the region of the target pixel, and the target pixel should be considered as an outlier. The weight $w_i$ calculated for the view 814 based on the local standard deviation will be higher than the weight calculated for the view 813.

Referring again to the method of FIG. 6, the operation 602 for example involves determining a threshold score based on a probability distribution for expected scores in the image.

The present inventors have found that the Laplace distribution is particularly well adapted to most infrared image scenes.

It is known that if $S \sim \text{Laplace}(0,\sigma)$, then $|S| \sim \text{Exp}(\sigma^{-1})$ is an exponential distribution. The probability density function $|S|\text{Exp}(\lambda)$, with $\lambda = \sigma^{-1}$, is therefore of the form $f(x) = \lambda e^{-\lambda x}$, where $\lambda > 0$. Its distribution function is $F(x) = 1 - e^{-\lambda x}$. The parameter $\lambda$ of the exponential can be estimated by estimating the mean, based on the mean of the sample, and taking the inverse of this mean:

$$\hat{\lambda} = \frac{n}{\sum_{i=1}^{n} |S|} \quad \sim 11$$

where n is the number of pixels in the image.

Calling the threshold $\text{thr}_{outlier}$, this threshold is for example calculated based on $\hat{\lambda}$ using the following equation:

$$\text{thr}_{outlier} = \frac{\ln(4)}{\hat{\lambda}} + 1.5 \times \frac{\ln(3)}{\hat{\lambda}} \quad \sim 12$$

Rather than calculating the threshold using this equation, an alternative would be to simply choose a threshold that filters out a certain percent of the scores, such as 95 percent of the scores. However, an advantage of filtering using the threshold described above based on the Laplace distribution is that it avoids problems introduced by noise. Indeed, if a fixed percentage of scores is selected, the number of pixels selected will be the same for a same image with and without noise. However, the threshold determined based on the Laplace distribution will vary based on the level of noise in the image.

The operation 603 of FIG. 6 for example involves identifying spurious pixels among the outliers identified in operation 602. This is for example achieved by selecting scores above a threshold level calculated based on the scores of the outliers. The threshold $\text{thr}_{SPUR}$ is for example determined using the following equation:

$$\text{thr}_{SPUR} = Q3 + x_{EI} \times (Q3 - Q1) \quad \sim 13$$

where $x_{EI}$ is a parameter for example chosen to be between 1.0 and 5.0, and for example equal to 1.5, and Q1 and Q3 are the first and third quartiles of the outliers identified in operation 602, respectively.

In some embodiments, to avoid false alerts, a pixel is only considered as a spurious pixel if its score exceeds the threshold $\text{thr}_{SPUR}$, and its score is above a minimum threshold $\text{thr}_{scoremin}$ equal to a fixed value.

An advantage of the embodiments described herein is that spurious pixels can be detected using a relatively simple and effective method. Furthermore, the method of correcting spurious pixels means that, rather than being classed as bad pixels, scene information-bearing pixel values from certain pixels can continue to be used to generate pixels of the image.

Having thus described at least one illustrative embodiment, various alterations, modifications and improvements will readily occur to those skilled in the art.

For example, while a specific example of a microbolometer is described in relation to FIGS. 1 and 2, it will be apparent to those skilled in the art that the methods described herein could be applied to various other implementations of a microbolometer, or to other types of IR imaging devices.

Furthermore, it will be apparent to this skilled in the art that the various operations described in relation to the various embodiments could be performed, in alternative embodiments, in different orders without impacting their effectiveness.

The invention claimed is:

1. A method of detecting spurious pixels of a pixel array of an imaging device sensitive to infrared radiation, the method comprising:
   receiving, by a processing device of the imaging device, an input image captured by the pixel array;
   calculating a score for a plurality of target pixels comprising at least some of the pixels of the input image, the score for each target pixel being generated based on k pixels of the input image selected within a window of H by H pixels around the target pixel, H being an odd integer of 3 or more, and k being an integer of between 2 and 5, each of the pixels of the set formed by the k pixels and the target pixel sharing at least one border or a corner with another pixel of said set, and the values of the k pixels pixels being at respective distances from the value of the target pixel, the k pixels being selected based on the distances of the k pixels and the score for each target pixel being calculated based on the distances of the k selected pixels; and
   detecting that at least one of the target pixels is a spurious pixel based on the calculated scores,
   wherein the selection of the k pixels comprises the successive steps of:
   forming, around the target pixel, a first group consisting of all of the pixels sharing at least one border or a corner with the target pixel, excluding the target pixel, and selecting within this first group a first pixel having a value that is closest to that of the target pixel;
   forming a second group consisting of the first group, excluding the first selected pixel, and of all the pixels sharing at least one border or a corner with the first selected pixel, and selecting within this second group a second pixel having a value that is closest to that of the target pixel; and
   repeating operations of forming a new group consisting of a latest group to be formed, excluding a previously selected pixel of the latest group, and of all pixels sharing at least one border or a corner with a selected pixel of the latest group and then of selecting, within this new group, a subsequent pixel having a value closest to that of the target pixel, until k pixels have been selected.

2. The method of claim 1, wherein H is an odd integer equal to 5 or more.

3. The method of claim 1, wherein the k pixels are selected in order to minimize the sum of the k distances.

4. The method of claim 1, wherein the score is equal to the sum of the k distances.

5. The method of claim 1, wherein detecting the at least one spurious pixel comprises comparing at least some of the scores with a threshold value.

6. The method of claim 1, further comprising, prior to calculating said scores, correcting the input image by applying gain and offset values to at least some of the pixel values of the input image.

7. A non-transitory computer-readable storage medium storing instructions for implementing the method of claim 1 when executed by a processing device.

8. A method of detecting spurious pixels of a pixel array of an imaging device sensitive to infrared radiation, the method comprising:
receiving, by a processing device of the imaging device, an input image captured by the pixel array;
calculating a score for a plurality of target pixels comprising at least some of the pixels of the input image, the score for each target pixel being generated based on k pixels of the input image selected within a window of H by H pixels around the target pixel, H being an odd integer of 3 or more, and k being an integer of between 2 and 5, each of the pixels of the set formed by the k pixels and the target pixel sharing at least one border or a corner with another pixel of said set, and the values of the k pixels being at respective distances from the value of the target pixel, the k pixels being selected based on the distances of the k pixels and the score for each target pixel being calculated based on the distances of the k selected pixels; and
detecting that at least one of the target pixels is a spurious pixel based on the calculated scores, comprising comparing a subset of the scores with a threshold value $\text{thr}_{SPUR}$, the subset comprising a plurality of the highest scores of the calculated scores of the plurality of target pixels, and wherein the threshold value $\text{thr}_{SPUR}$ is calculated based on the following equation:

$$\text{thr}_{SPUR} = Q3 + x_{EI} \times (Q3 - Q1)$$

where $x_{EI}$ is a parameter equal to at least 1.0 and Q1 and Q3 are the first and third quartiles respectively of the subset.

9. The method of claim 8, further comprising, prior to calculating said scores, correcting the input image by applying gain and offset values to at least some of the pixel values of the input image.

10. A non-transitory computer-readable storage medium storing instructions for implementing the method of claim 8 when executed by a processing device.

11. A method of detecting spurious pixels of a pixel array of an imaging device sensitive to infrared radiation, the method comprising:
receiving, by a processing device of the imaging device, an input image captured by the pixel array;
calculating a score for a plurality of target pixels comprising at least some of the pixels of the input image, the score for each target pixel being generated based on k pixels of the input image selected within a window of H by H pixels around the target pixel, H being an odd integer of 3 or more, and k being an integer of between 2 and 5, each of the pixels of the set formed by the k pixels and the target pixel sharing at least one border or a corner with another pixel of said set, and the values of the k pixels being at respective distances from the value of the target pixel, the k pixels being selected based on the distances of the k pixels and the score for each target pixel being calculated based on the distances of the k selected pixels; and
detecting that at least one of the target pixels is a spurious pixel based on the calculated scores, comprising comparing at least some of the calculated scores with a threshold value $\text{thr}_{SPUR}$, and selecting at least some of the calculated scores by applying a further threshold to the calculated scores, wherein said further threshold is calculated based on an assumption that the pixel values in the image have a probability distribution based on a Laplace distribution.

12. The method of claim 11, further comprising, prior to calculating said scores, correcting the input image by applying gain and offset values to at least some of the pixel values of the input image.

13. A non-transitory computer-readable storage medium storing instructions for implementing the method of claim 11 when executed by a processing device.

14. A method of detecting spurious pixels of a pixel array of an imaging device sensitive to infrared radiation, the method comprising:
receiving, by a processing device of the imaging device, an input image captured by the pixel array;
calculating a score for a plurality of target pixels comprising at least some of the pixels of the input image, the score for each target pixel being generated based on k pixels of the input image selected within a window of H by H pixels around the target pixel, H being an odd integer of 3 or more, and k being an integer of between 2 and 5, each of the pixels of the set formed by the k pixels and the target pixel sharing at least one border or a corner with another pixel of said set, and the values of the k pixels being at respective distances from the value of the target pixel, the k pixels being selected based on the distances of the k pixels and the score for each target pixel being calculated based on the distances of the k selected pixels; and
detecting that at least one of the target pixels is a spurious pixel based on the calculated scores, comprising comparing at least some of the calculated scores with a threshold value $\text{thr}_{SPUR}$, and selecting at least some of the calculated scores by applying a further threshold to the calculated scores, wherein said further threshold is calculated based on the following equation:

$$\text{thr}_{outlier} = \frac{\ln(4)}{\hat{\lambda}} + 1.5 \times \frac{\ln(3)}{\hat{\lambda}}$$

where $\hat{\lambda}$ is an estimation of the parameter $\hat{\lambda}$ of the exponential distribution $f(x) = \lambda e^{-\lambda x}$ of the absolute values of the calculated scores.

15. The method of claim 14, further comprising, prior to calculating said scores, correcting the input image by applying gain and offset values to at least some of the pixel values of the input image.

16. A non-transitory computer-readable storage medium storing instructions for implementing the method of claim 14 when executed by a processing device.

17. An image processing device comprising:
a processing device adapted to receive an input image captured by a pixel array of an imaging device sensitive to infrared radiation; and
a memory storing the input image;
wherein the processing device is further adapted to:
calculate a score for a plurality of target pixels comprising at least some of the pixels of the input image, the score for each target pixel being generated based on k pixels of the input image selected within a window of H by H pixels around the target pixel, H being an odd integer of 3 or more, and k being an integer of between 2 and 5, each of the pixels of the set formed by the k pixels and the target pixel sharing at least one border or a corner with another pixel of said set, and the values of the k pixels being at respective distances from the value of the target pixel, the k pixels being selected based on the distances of the k pixels and the score for each target pixel being calculated based on the distances of the k selected pixels; and detect that at least one of the target pixels is a spurious pixel based on the calculated scores, wherein the processing device is adapted to select the k pixels by the successive steps of:

forming, around the target pixel, a first group consisting of all of the pixels sharing at least one border or a corner with the target pixel, excluding the target pixel, and selecting within this first group a first pixel having a value that is closest to that of the target pixel;

forming a second group consisting of the first group, excluding the first selected pixel, and of all the pixels sharing at least one border or a corner with the first selected pixel, and selecting within this second group a second pixel having a value that is closest to that of the target pixel; and repeating operations of forming a new group consisting of a latest group to be formed, excluding a previously selected pixel of the latest group, and of all pixels sharing at least one border or a corner with a selected pixel of the latest group and then of selecting, within this new group, a subsequent pixel having a value closest to that of the target pixel, until k pixels have been selected.

18. The image processing device of claim 17, wherein the k pixels are selected in order to minimize the sum of the k distances.

19. The image processing device of claim 17, wherein the score is equal to the sum of the k distances.

* * * * *